United States Patent

Fino et al.

[15] 3,648,743

[45] Mar. 14, 1972

[54] EQUIPMENT FOR LONGITUDINALLY CUTTING TREE LOGS

[72] Inventors: Michele Fino; Giorgio Giussani, both of 48, Via Prealpi, Mariano Comense, Como, Italy

[22] Filed: Jan. 14, 1970

[21] Appl. No.: 2,823

[30] Foreign Application Priority Data

Jan. 23, 1969 Italy ......................... 11904 A/69

[52] U.S. Cl. ................................. 143/39, 143/31 R
[51] Int. Cl. ......................................... B27b 7/00
[58] Field of Search ............ 143/39, 59, 50; 144/312, 208 H, 144/209 I

[56] References Cited

UNITED STATES PATENTS

| | | | |
|---|---|---|---|
| 3,448,780 | 6/1969 | Hervey | 143/39 |
| 3,098,513 | 7/1963 | Giugni et al | 144/208 H |
| 678,658 | 7/1901 | Grant | 143/39 |
| 3,037,538 | 6/1962 | Graham | 144/209 A |

*Primary Examiner*—Donald R. Schran
*Attorney*—McGlew and Toren

[57] ABSTRACT

An equipment for longitudinally cutting tree logs comprising, in combination with a cutting machine tool, a log supporting carriage having means for individually displacing the log ends in order to cause the log axis to be positioned in coincidence with a predetermined line which defines a cutting tool halfplane, and means to rotate the supported log. Said combination allows to carryout a log cutting operation into three 120° sectors, two optical systems being provided for better positioning said log axis before each cutting operation.

9 Claims, 4 Drawing Figures

EQUIPMENT FOR LONGITUDINALLY CUTTING TREE LOGS

BACKGROUND

This invention concerns an equipment for longitudinally cutting tree logs across half-planes converging toward and originating from a single previously identified straight line, essentially coinciding with the tree log axis. In particular, the equipment according to the invention is designed to longitudinally cut tree logs into sectors, which are then individually subjected to further shearing operations, carried out by already known procedures and equipments, said sectors being defined by half-planes originating from said straight line and lying at angles greater than 90° but smaller than 180°, and preferably at angles of 120° whereby the tree log is cut into three equal sectors.

According to an already known practice, the tree logs are longitudinally cut into sectors in order to better overwork the same and to facilitate further shearing operations, which are directly performed on said thus obtained sectors. The tree logs are usually cut into two 180° sectors or into four 90° sectors, depending on the log sizes, the properties thereof and final applications of the sheared products, the related cutting operations being carried-out by means of a single longitudinal cut or two; longitudinal cross-directed cuts, respectively.

However, it was ascertained that, when tree logs having a given range of diameters and/or peculiar properties are involved, in order to better utilize said logs, it is preferably to have them cut into sectors having angular amplitudes ranging from 90° to 180°, and in particular into three similar sectors having each an angular amplitude of 120°. However such cutting operation is somewhat difficult, owing to the fact that three longitudinal cuts, converging in a single straight line preferably and substantially coincident with the middleline or heartwood of log are to be carried-out, while when the logs are halved or quartered said convergence line is not present or otherwise it is automatically obtained all along the log axis when said cross cuts are carried-out.

Owing to such difficulties in the log cutting operations, that consist above all in the subsequent log adjustments at 120° in respect of the cutting blade and which are hard to deal with and result in an unacceptable loss of time, such method has never found a wide acceptance in the practice, though being economically convenient from the viewpoint of the wood overwork.

An object of this invention is therefore to provide an equipment to easily and quickly cut tree logs across half-planes converging in a single straight line and forming angles greater than 90° but smaller than 180° whereby to have said tree logs divided into a plurality of sectors and preferably into three similar sectors.

Another object of the invention is to provide an equipment of the type and for the applications referred to, comprising means to quickly locate the axis of heartwood in coincidence with an imaginary line wherefrom said cutting half-planes originate, before each subsequent cutting operation across one of said half-planes and means to position the log in respect of the cutting tool in such a manner as said cutting operation be successively performed across half-planes brought in the tool plane.

A further object of the invention is to provide an equipment of the type disclosed wherein said log positioning operations in respect of the cutting tool, in particular for bringing the log axis in coincidence with said imaginary line, can be performed by a single operator and from a single control station, through one or more optical systems for controlling and checking said coincidence condition.

SUMMARY

The above and further objects of the invention are accomplished by an equipment according to the invention comprising in combination, a cutting device—e.g., a circular saw or the like—adapted to cut the log across a half-plane as defined by a straight line and a log supporting and positioning assembly adapted to sequentially place the log in the correct positions as required for the carrying-out the cutting operations across planes lying at angles greater than 90° but smaller than 180°, which are successively brought in coincidence with said half-plane of cutting device. More detailedly said log supporting and positioning assembly must be able to lift and move the log along two directions orthogonal with each other and with said straight line defining the half-plane of the cutting device, until the log axis substantially coincides with said straight line, and moreover it must be able to turn the log about said axis or at any rate about a longitudinal axis, maintaining or restoring said coincidence condition, in order to sequentially bring the log cut half-plane in coincidence with the cutting device half-plane. Finally, said equipment must be able to impart a relative motion between the log and the cutting tool, to obtain the required feeding displacement.

Said log positioning means and said log feeding means relative to the cutting tool are preferably grouped in a single assembly by which the log is supported, positioned and fed in respect of the machine tool that is kept stationary, the operation of said assembly being controlled from a stationary control station which controls the operation of the machine tool too.

Moreover, according to a further feature of the invention, at least two optical systems are provided, by which two images relative to points of said straight line defining the cutting tool half-plane are transferred to an ocular and superposed therein, said optical systems being adapted to check the coincidence of the log axis with said straight line when the images of two points located on the intersections of the log heads with the log axis superpose themselves in said ocular.

DRAWINGS

Figure 3:
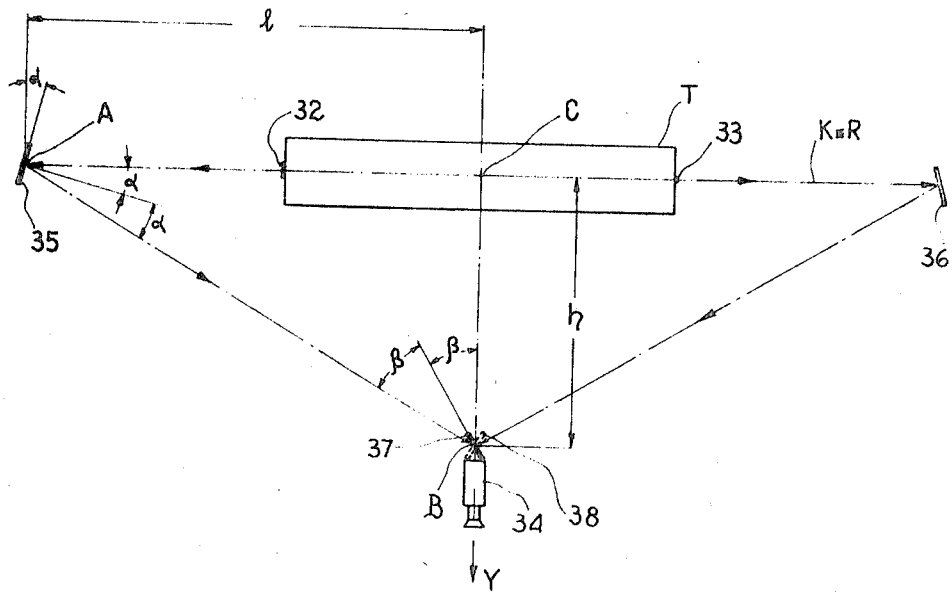
Figure 4:
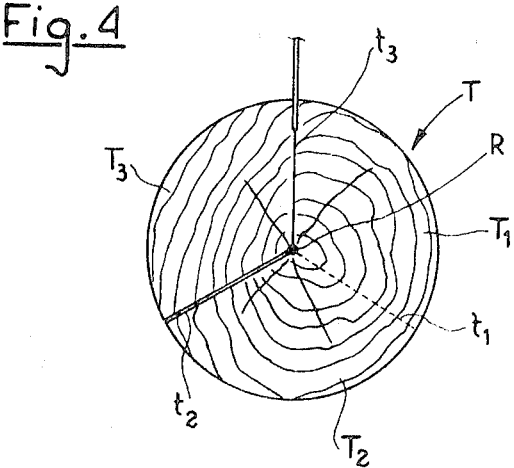

FIG. 3 diagrammatically shows the arrangement of optical means adapted to check the correct log positioning and FIG. 4 shows a tree log head as cut in three sectors by the equipment according to the invention.

PREFERRED EMBODIMENT

Figure 1:
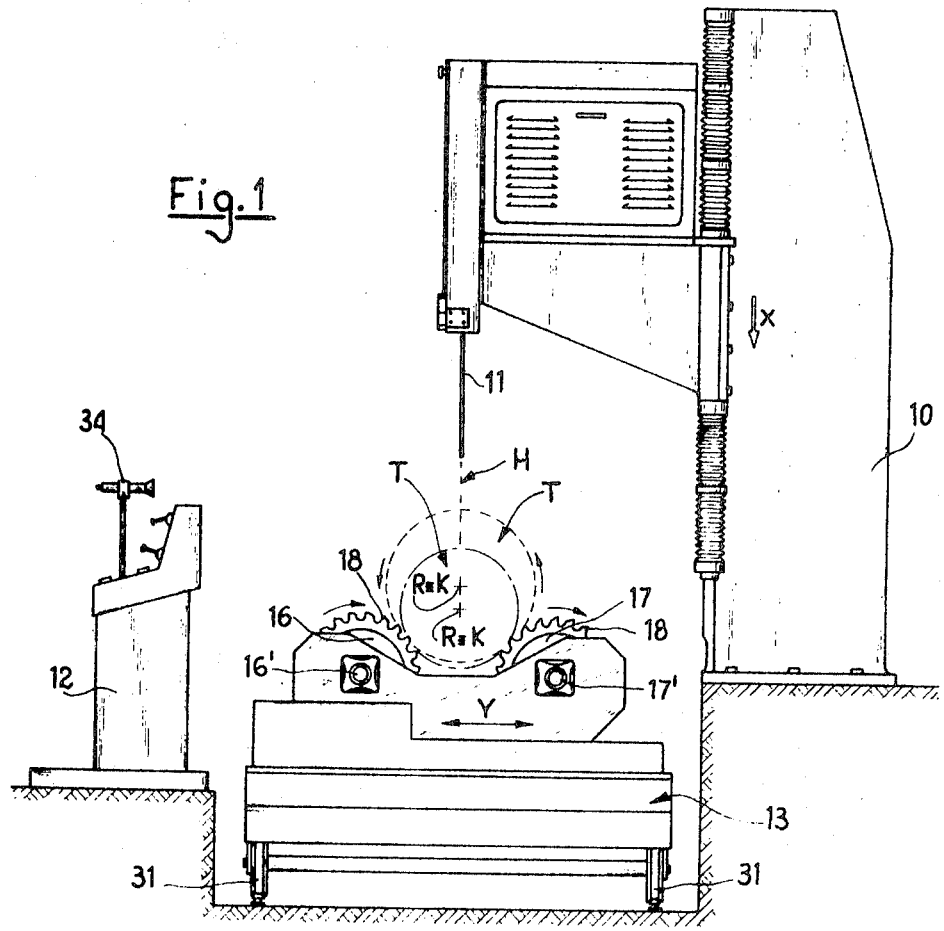
FIG. 1 is a front view of an equipment according to the invention.
Figure 2:
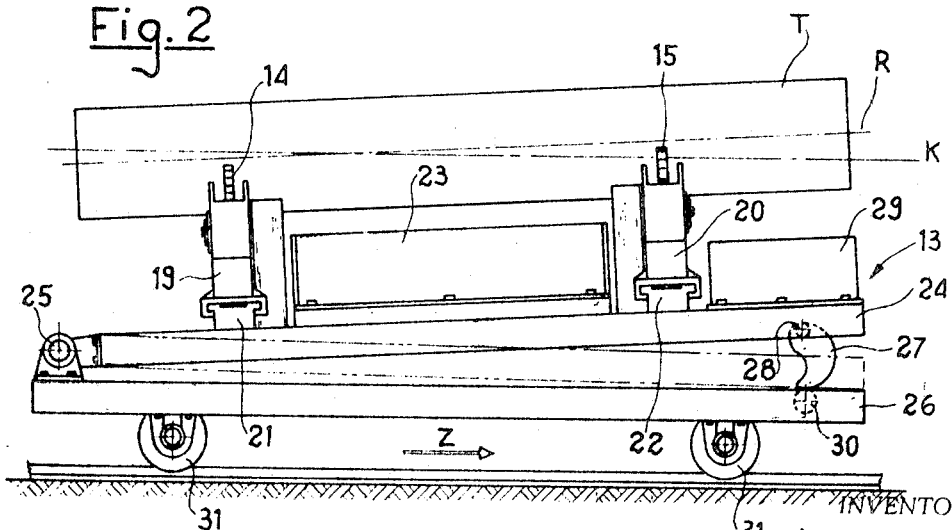
FIG. 2 is a side view of a log supporting and positioning assembly forming part of the equipment of FIG. 1.

Referring firstly to FIGS. 1 and 2, they show a preferred embodiment of an equipment by which tree logs can be cut across half-planes converging towards and originating from a common straight line and, in particular as shown in FIG. 4, for longitudinally cutting a tree log T into sectors having an angular amplitude ranging from 90° to 180° and preferably into three sectors $T_1$, $T_2$, $T_3$ having an equal angular amplitude of 120° and defined by cutting half-planes $t_1$, $t_2$, $t_3$ converging towards a straight line R that substantially coincides with the heartwood axis of said log T.

According to the invention, the equipment consists of a cutting device, e.g., a circular saw 10 having a tool 11 supported and driven in an already known manner and adapted to cut the log T across a half-plane H wherein said tool is lying, the half-plane H being defined by a straight line K having a position depending on the stroke adjustment in the direction X across which said cutting tool is caused each time to travel. The design and arrangement of said circular saw 10 shall not be described more detailedly, since such machine tool is substantially known and commercially available. The machine tool must only comprise a cutting tool adapted to cut across a plane and means for controlling the cutting and feeding motions of the cutting tool across the log, said means being preferably controlled from a stationary control station 12, comprising also means for controlling all other equipment components.

The equipment comprises, in combination with the above defined machine tool 10, a supporting and positioning assembly 13, by which the tree log T is sequentially positioned in respect of the cutting tool 11 each time in the correct position before the cutting operation across the cutting planes $T_1$–$t_3$ (see FIG. 4).

To perform said log positioning, the assembly 13 advantageously comprises two pairs of rollers 14 and 15, each formed by two rollers 16 and 17 having toothed surfaces 18 for a better engagement with the log, said rollers being adapted to simultaneously rotate in either directions about their pivot pins 16', 17' in order to cause a corresponding rotation in the opposite direction of log T and thus sequentially placing the planes $t_1$–$t_3$ to be cut in front of the cutting tool 11. Each pair of rollers 14, 15 acts simultaneously to support the log and thus it is advantageously located near the log ends whereby to simultaneously obtain both a reliable log support and wide possibility to move the same in a direction perpendicular to said straight line defining the cutting half-plane of the tool 11.

To perform said motions, each pair 14, 15 of rollers rests on a supporting element 19, 20 that can be moved in a direction Y perpendicular to said cutting plane H on suitable guides 21, 22, said supporting elements 19, 20 being independently driven by motor means, e.g., fitted within a housing 23 and controlled from the station 12. By such motions of the roller pairs 14, 15 the log axis R can be brought within the plane as defined by the cutting tool 11; under such conditions, the straight line K, wherefrom said cutting half-plane H of tool 11 originates, is defined by a point of said axis R.

Said guides 21 and 22, whereon the supporting elements 19, 20 are slidingly fitted, are fastened to a supporting plate 24 pivotally connected as in 25 to a base frame 26 of said assembly 13 and adapted to be swung about the pivot pin 25. In particular, the swinging motion of the plate 24 is controlled by a profiled cam 27 that is pivotally connected as in 28 to said supporting plate 24 and driven by motor means, e.g., fitted in a housing 29 and controlled from the station 12, said cam 27 engaging with a cam follower 30 that is fitted in a suitable position in the base frame 26. As it can be noticed from FIG. 2, said swinging motion allows to control the inclination of the log axis R in respect to said straight line K, defining the tool cutting half-plane H and having a position which will be defined later on, within a pre-established angular field, extending on either sides of said straight line K. The base frame 26 of the assembly 13 is also fitted with bearing wheels 31 which allow to advance said assembly and thus the log T in a pre-established direction Z parallel to the straight line K defining the half-plane H, a point of said straight line being defined by the limit each time established for the stroke of the tool 11 in the direction X.

By the previously described equipment, all log positioning operations before each longitudinal cut can be easily performed. Once a log T has been laid on the pairs of rollers 14 and 15 and the axis R thereof has been recognized, the supporting elements 19 and 20 are operated in order to bring said axis R in the plane of tool 11, a point of said log axis coinciding with a point of the straight line K by which the half-plane H is defined. Then the cam 27 is acted upon until the axis R is brought parallel to the direction Z and coincident with the straight line K. After adjusting of the tool cutting depth, as defined by said straight line K coincident with the axis R, the tool is operated and the carriage 13 is advanced until completion of the longitudinal cut. After completion of said operation the log cut sections are clinched on either sides of the cut line, e.g., on both log front ends and the log is turned by the required angle, e.g., by 120°, to perform a further longitudinal cut. However, before said further cut, the coincidence condition between the axis R and the straight line K is to be again checked and in case restored by the above described motions, which may be performed even in a different sequence.

For checking said coincidence between the axis R and the straight line K, a pair of optical systems of the type as shown in FIG. 3 are used. Said optical systems are adapted to transfer the images of the log axis R, represented e.g., by reference spots or points 32, 33 suitably located on the log front sides to an ocular 34, that is advantageously located near the control station 12. As shown in FIG. 3, said optical systems comprise each a mirror 35, 36 by which the images of points 32, 33 are picked-up and reflected to a further mirror or prism 37, 38 by which the same are further deflected and directed to the ocular 34. The arrangement of mirrors 35, 36 and of mirrors or prisms 37, 38 is such that two points lying on a whatever straight line K in the plane of cutting tool 11 and parallel to the direction Z and thus two points lying on the straight line K by which the half-plane H is defined, form images which become superimposed in the ocular 14, thus forming a single image. Thus, by said two optical systems located and adjusted as described above, a check of the alignment of both straight lines R and K can be easily and quickly performed by merely verifying whether the images of points 32, 33 located on the log axis R become superimposed in the ocular 34.

The mutual arrangement of the optical system components in order to obtain the above specified transmission of images can be easily established on the basis of simple angular and trigonometrical relations. Referring to FIG. 3, the intersections with the mirrors 35, 37 of a spot-shaped image lying on the straight line K are indicated by A and B, while C is the projection of B on said straight line K; to obtain that said image be transferred to the ocular 34 in the direction Y, the mirrors 35, 37 shall be positioned in such a manner as to form the angles $\alpha$ and $\beta$ respectively with a line parallel to straight line B-C and with said straight line B-C. The first of such angles is calculated from a simple trigonometric relation: $\tan 2\alpha = h/l$, wherein $h = \overline{BC}$ and $l = \overline{AC}$, while the angle $\beta$ is obtained from the relation $\beta = 45° - \alpha$. When a prism is advantageously substituted for the mirror 37, similar relations are used, wherein the deviation angle of the prism is introduced.

While the invention has been described with reference to a preferred embodiment, it will be understood by those skilled in the art that various changes and modifications may be made therein without departing from the spirit and scope of the inventions, as defined in the appended claims.

We claim:

1. Equipment for longitudinally cutting a tree log into sectors in which the tree log is cut along planes extending radially outwardly from a straight line with which the axis of the heartwood of the log to be cut is made to coincide, the cutting planes of the tree log being angularly spaced apart by an angle greater than 90° and smaller than 180°, comprising an automatic cutting device for effecting the longitudinal cuts through the log, said cutting device being adjustable for positioning on the straight line with which the axis of the heartwood of the log coincides, a supporting and positioning assembly for locating the tree log in position to be cut by said cutting device and for moving the tree log during the cutting operation, wherein the improvement comprises that said supporting and positioning assembly comprises a horizontally arranged base frame, bearing wheels mounted on said base frame and arranged for moving said base frame along a line parallel to the straight line with which the axis of the heartwood of the log coincides, a supporting plate movably displaceably mounted on said base frame for movement in a direction upwardly from said base frame so that the opposite ends thereof can be positioned at different heights relative to said base frame, a guide positioned on said supporting plate adjacent each of its opposite ends, a supporting element movably mounted on each said guide for movement in a horizontal direction substantially normally of the direction of travel of said base frame, a pair of rollers mounted on and extending upwardly from each supporting element for supporting a tree log, said rollers being spaced apart and being rotatable in opposite directions, and means for imparting a relative motion between the log to be cut and said cutting device for moving the log in a direction parallel to the straight line with which the axis of the heartwood of the log coincides.

2. Equipment, as set forth in claim 1, wherein the periphery of said rollers is provided with a plurality of outwardly extending sharp projections for ensuring a positive engagement with the log to be cut.

3. Equipment, as set forth in claim 2, wherein means are arranged for displacing said supporting plate and said guides and rollers mounted thereon through preestablished angles in a direction perpendicular to the straight line so that said supporting plate forms an acute angle with said base frame.

4. Equipment, as set forth in claim 3, wherein said means for angularly displacing said supporting plate comprises a horizontally arranged pivot pin secured to said base frame at one end thereof, and said supporting plate being pivotally connected to said pivot pin so that its opposite end can be displaced upwardly from said base frame.

5. Equipment according to claim 1, wherein said means to impart a relative motion between the log and said cutting device comprise means to move said supporting and positioning assembly in either longitudinal directions.

6. Equipment according to claim 1, wherein optical means are provided for verifying and checking the coincidence of said straight line with the log axis, as achieved through operation of said log lifting and positioning means.

7. Equipment according to claim 6, wherein said optical means consist of reflecting and/or refracting means adapted to individually bring the images of the intersection points of log axis with the log end surfaces, as previously identified to a single checking ocular.

8. Equipment according to claim 7, wherein said reflecting and/or refracting means comprise two single optical systems having components stationarily fitted at both ends of log stroke and close to said ocular, said components showing optical properties and a mutual spatial arrangement adapted to superpose within said ocular the images of points of said straight line as separately sent to said ocular by said two systems.

9. Equipment according to claim 8, wherein said supporting and positioning assembly is operated by a control station including said verifying and checking ocular.

\* \* \* \* \*